US011288787B2

(12) United States Patent
Nakashima et al.

(10) Patent No.: US 11,288,787 B2
(45) Date of Patent: Mar. 29, 2022

(54) CORRELATION VALUE CALCULATION DEVICE

(71) Applicant: OLYMPUS CORPORATION, Hachioji (JP)

(72) Inventors: Aya Nakashima, Tokyo (JP); Osamu Koshiba, Chiba (JP)

(73) Assignee: OLYMPUS CORPORATION, Tokyo (JP)

(*) Notice: Subject to any disclaimer, the term of this patent is extended or adjusted under 35 U.S.C. 154(b) by 281 days.

(21) Appl. No.: 16/590,519

(22) Filed: Oct. 2, 2019

(65) Prior Publication Data

US 2020/0034960 A1    Jan. 30, 2020

Related U.S. Application Data

(63) Continuation of application No. PCT/JP2017/014244, filed on Apr. 5, 2017.

(51) Int. Cl.
*G06K 9/00* (2022.01)
*G06T 7/00* (2017.01)
(Continued)

(52) U.S. Cl.
CPC ............ *G06T 7/0002* (2013.01); *G06F 17/15* (2013.01); *G06F 17/18* (2013.01); *G06T 3/4007* (2013.01); *G06T 2207/20224* (2013.01)

(58) Field of Classification Search
CPC ..... G06T 3/4007; G06T 3/403; G06T 7/0002; G06T 5/001; G06T 2207/20224;
(Continued)

(56) References Cited

U.S. PATENT DOCUMENTS 5,991,464 A * 11/1999 Hsu .................. G06T 3/4023
348/448
5,995,154 A * 11/1999 Heimburger ........... H04N 7/012
348/448
(Continued)

FOREIGN PATENT DOCUMENTS

JP     2007-88910 A    4/2007
JP     2007-181168 A   7/2007
(Continued)

OTHER PUBLICATIONS

International Search Report dated Jun. 27, 2017, issued in counterpart International Application No. PCT/JP2017/014244, w/English translation (4 page).

*Primary Examiner* — Amir Alavi
(74) *Attorney, Agent, or Firm* — Westerman, Hattori, Daniels & Adrian, LLP

(57) ABSTRACT

A correlation value calculation device for selecting a pixel of interest within an image and a plurality of reference pixels within the image or a different image and calculating correlation values between a base block including the pixel of interest at a prescribed position and a plurality of reference blocks including each reference pixel at the prescribed position and having the same block size as the base block includes a block size determination unit, first intermediate correlation value calculation units configured to calculate correlation values in a plurality of types of block sizes, second intermediate correlation value calculation units configured to calculate correlation values in some block sizes among the plurality of types of block sizes, and a correlation value interpolation unit configured to obtain correlation values according to an interpolation.

9 Claims, 12 Drawing Sheets

(51) Int. Cl.
*G06F 17/15* (2006.01)
*G06F 17/18* (2006.01)
*G06T 3/40* (2006.01)

(58) Field of Classification Search
CPC ......... G06F 17/18; G06F 17/15; H04N 9/045; H04N 7/012
See application file for complete search history.

(56) References Cited

U.S. PATENT DOCUMENTS

| | | | | |
|---|---|---|---|---|
| 6,128,416 A * | 10/2000 | Oura | ............... | H04N 1/3876 348/239 |
| 7,180,548 B2 * | 2/2007 | Mishima | ............... | H04N 7/0132 348/441 |
| 7,280,709 B2 * | 10/2007 | Minami | ............... | H04N 7/012 348/448 |
| 8,040,950 B2 * | 10/2011 | Ha | ............... | H04N 19/53 375/240.16 |
| 8,189,104 B2 * | 5/2012 | Ohwaki | ............... | H04N 5/144 348/451 |
| 8,264,600 B2 * | 9/2012 | Kondo | ............... | H04N 7/012 348/441 |
| 8,320,458 B2 * | 11/2012 | Sato | ............... | H04N 7/014 375/240.16 |
| 8,335,258 B2 * | 12/2012 | Okumura | ............... | H04N 7/014 375/240.16 |
| 8,625,892 B2 * | 1/2014 | Nakamura | ............... | H04N 1/40 382/167 |
| 2007/0140591 A1 | 6/2007 | Kurata | | |
| 2015/0235103 A1 | 8/2015 | Komatsu et al. | | |
| 2020/0034960 A1 * | 1/2020 | Nakashima | ............... | H04N 19/43 |

FOREIGN PATENT DOCUMENTS

| | | |
|---|---|---|
| JP | 2013-121044 A | 6/2013 |
| JP | 2015-152484 A | 8/2015 |
| JP | 2017-17585 A | 1/2017 |

* cited by examiner

FIG. 10

CORRELATION VALUE CALCULATION DEVICE

This application is a continuation application based on a PCT International Application No. PCT/JP2017/014244. The content of the PCT International Application is incorporated herein by reference.

FIELD OF THE INVENTION

The present invention relates to a correlation value calculation device for calculating a correlation value between images.

DESCRIPTION OF RELATED ART

In a noise reduction process, motion vector detection, and the like in image processing, correlation value calculation between images is often performed. The correlation value indicates a degree of similarity between images. A correlation value between two images (in which one image is referred to as a base frame and the other image is referred to as a reference frame) is calculated from a difference between pixel values of pixels at the same position or the like between a specific region (a base block) in the base frame and a specific region (a reference block) within a reference frame having the same block size as the base block. For the correlation value calculation, a calculation method based on a sum of absolute differences (SAD), a sum of squared differences (SSD), or the like is known.

In the noise reduction process, the motion vector detection, and the like, it is necessary to perform the correlation value calculation at a high speed. Thus, a dedicated circuit (a correlation value calculation device) configured to perform the correlation value calculation is normally provided in a device for performing the noise reduction process, the motion vector detection, or the like. In Patent Document 1, a motion vector detection device provided with a correlation value calculation device is described.

The correlation value calculation device includes a correlation value calculation unit configured to calculate correlation value at a high speed in units of block size. The speed of the correlation value calculation of the correlation value calculation device is increased by providing the correlation value calculation units in parallel. With an increase in a degree of parallelism of the correlation value calculation units and an increase in a block size, a circuit scale of the correlation value calculation device is also increasing. There is a demand for the reduction of the increased circuit scale.

Correlation value calculation units of the correlation value calculation device described in Japanese Unexamined Patent Application, First Publication No. 2007-88910 include calculators, each of which calculates an SAD for one line of a block size, and an SAD for the block size is calculated by accumulating and summing calculated SADs for lines, so that the circuit scale is reduced.

SUMMARY OF THE INVENTION

According to a first aspect of the present invention, a correlation value calculation device selects a pixel of interest within an image and a plurality of reference pixels within the image or a different image and calculates correlation values between a base block including the pixel of interest at a prescribed position and a plurality of reference blocks including each reference pixel at the prescribed position and having the same block size as the base block. The correlation value calculation device includes: a block size determination unit configured to select one block size for the base block and the reference block from a plurality of types of block sizes and determine the selected block size; first intermediate correlation value calculation units configured to calculate correlation values between the base block and the reference blocks including first reference pixels, which are some of the reference pixels, at the prescribed position in the plurality of types of block sizes; second intermediate correlation value calculation units configured to calculate correlation values between the base block and the reference blocks including second reference pixels, which are the remaining reference pixels, at the prescribed position in at least some block sizes among the plurality of types of block sizes; and a correlation value interpolation unit configured to obtain interpolation target correlation values for other block sizes that are not calculated by the second intermediate correlation value calculation units according to an interpolation by using correlation values for the other block sizes calculated by the first intermediate correlation value calculation unit and output the interpolation target correlation values as calculation results of the second intermediate correlation value calculation units when the selected block sizes are the other block sizes.

BRIEF DESCRIPTION OF THE DRAWINGS

FIG. 10 is a diagram showing classification of reference points in the correlation value calculation device according to the second embodiment of the present invention.

DETAILED DESCRIPTION OF THE INVENTION

First Embodiment

A first embodiment of a correlation value calculation device of the present invention will be described with reference to FIGS. 1 to 8.

A correlation value calculation device 100 according to the present embodiment is mounted in a device configured to perform a noise reduction process, motion vector detection, and the like to calculate correlation values at a high speed.

Figure 1:
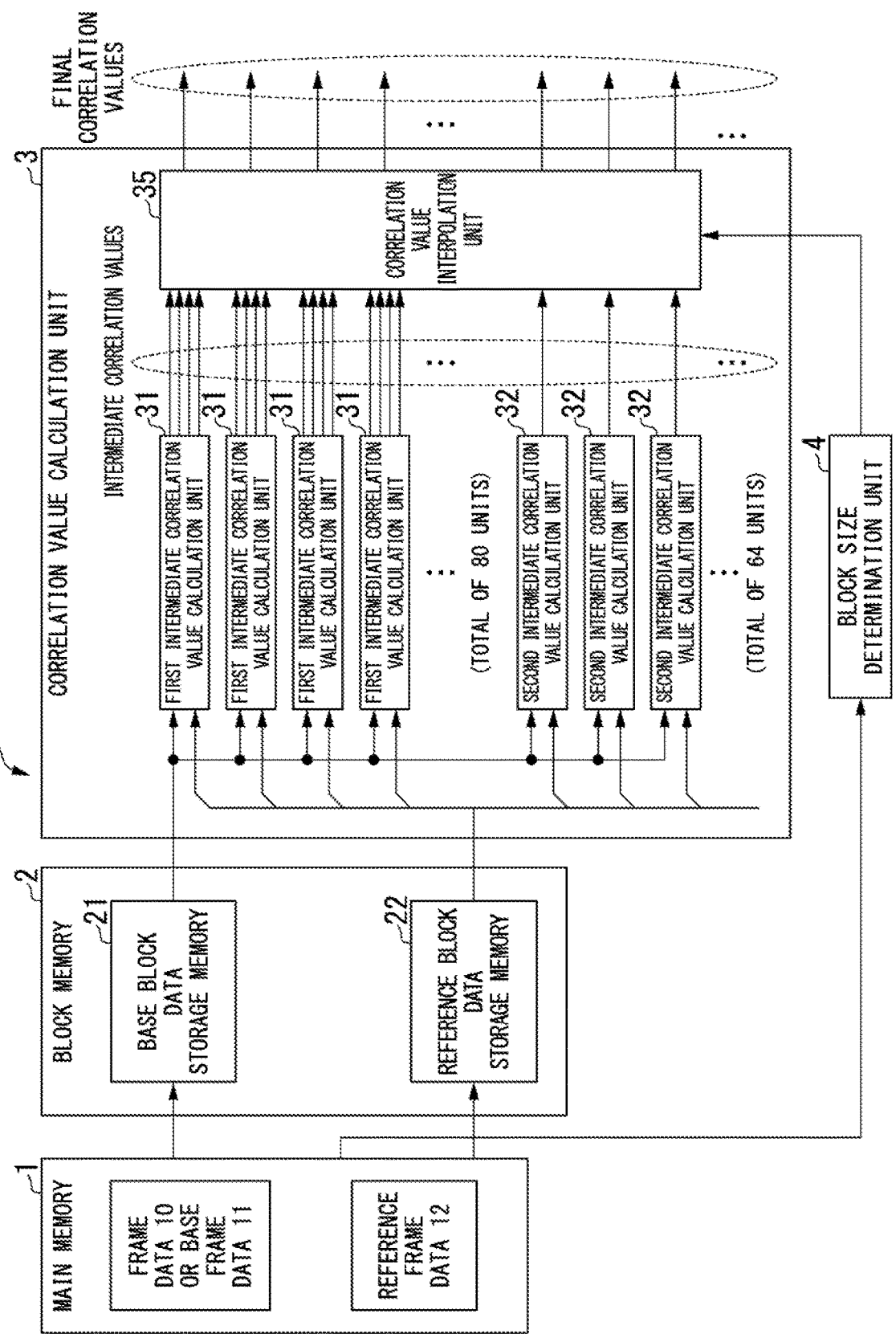
FIG. 1 is a diagram showing a correlation value calculation device according to a first embodiment of the present invention.

FIG. 1 is a diagram showing a configuration of the correlation value calculation device 100. The correlation value calculation device 100 calculates a correlation value between a specific region (a base block) and a specific region (a reference block) within one image (frame). The specific region has the same block size as the base block.

Figure 2:
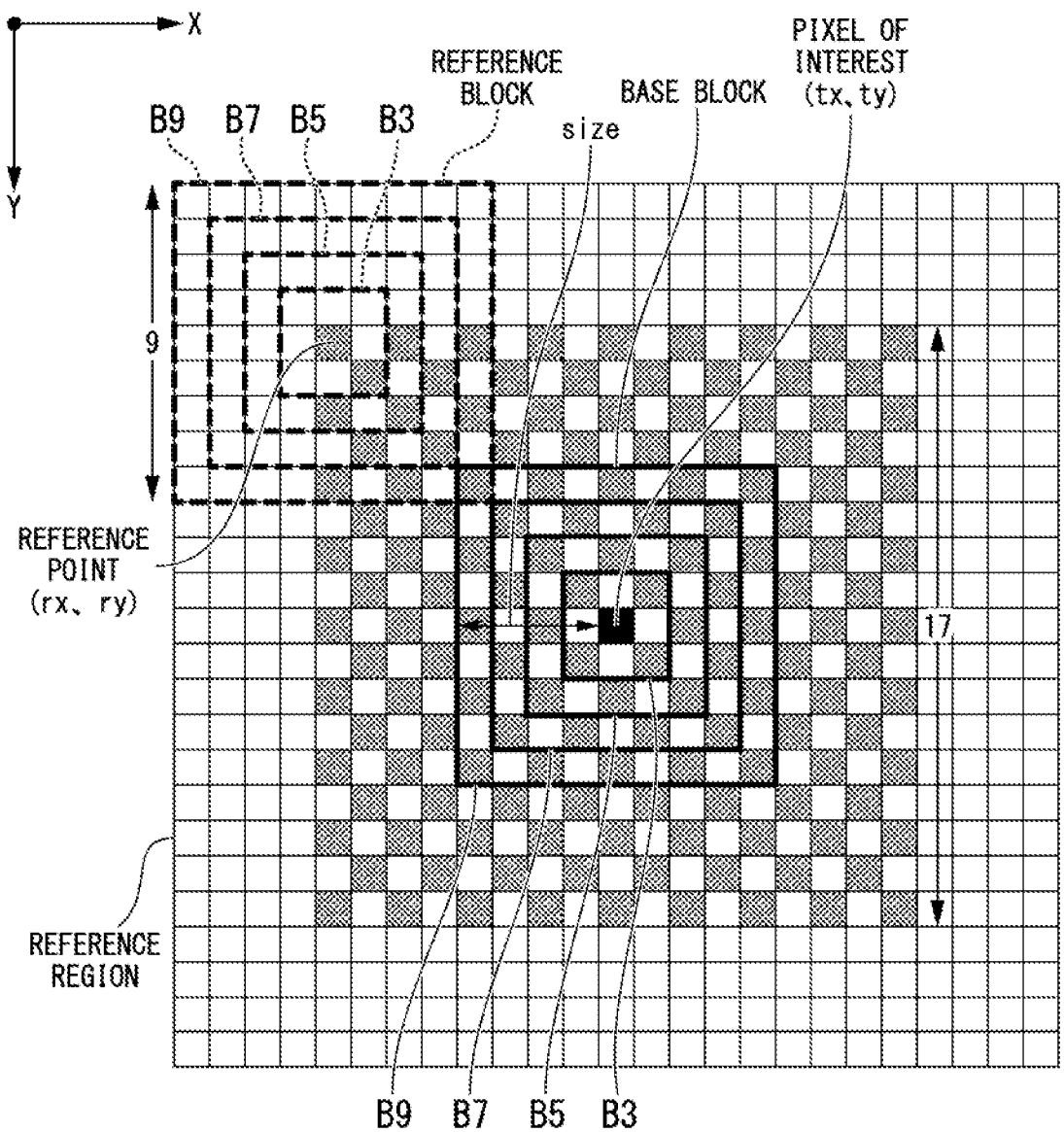
FIG. 2 is a diagram showing a relationship between a base block and a reference block.

As shown in FIG. 2, the correlation value calculation device 100 of the present embodiment calculates correlation values between a base block whose central pixel is set as a pixel of interest (tx, ty) of an image (a frame) and a plurality of reference blocks in parallel.

In the following description, XY coordinates are used to describe positions of pixels of the image. As shown in FIG. 2, the horizontal direction is defined as an X-axis direction, the vertical direction is defined as a Y-axis direction, and an upper-left point is defined as the origin. The XY coordinates are represented as (X, Y)=(0, 0).

The correlation value calculation device 100 includes a main memory 1, a block memory 2, a correlation value calculation unit 3, and a block size determination unit 4.

The main memory 1 includes a dynamic random access memory (DRAM) or the like and stores image data (frame data 10) that is a correlation value calculation target.

The correlation value calculation device 100 may calculate a correlation value at a high speed between a specific region (a base block) within a base frame and a specific region (a reference block) within a reference frame having the same block size as the base frame in two images (in which one image is referred to as the base frame and the other image is referred to as the reference frame).

When the correlation value calculation device 100 calculates the correlation value between the two images (the base frame and the reference frame), the main memory 1 stores both base frame data 11 and reference frame data 12.

The block memory 2 is a memory for storing data of the base block and the reference block which are the correlation value calculation target and includes a base block data storage memory 21 and a reference block data storage memory 22.

The base block data storage memory 21 includes a static random access memory (SRAM), a register file, or the like and stores data of at least one base block in the frame data 10 stored in the main memory 1. The data of the base block is read from the main memory 1 by a CPU (not shown) or the like and transferred to the base block data storage memory 21.

The reference block data storage memory 22 includes an SRAM, a register file, and the like and stores data of a plurality of reference blocks within the frame data 10 stored in the main memory 1. The data of the reference block is read from the main memory 1 by the CPU (not shown) or the like and transferred to the reference block data storage memory 22.

In the frame data 10, reference points (reference pixels) are 144 pixels obtained by excluding a pixel of interest from pixels arranged in a checkered pattern in a region whose central pixel is set as the pixel of interest and which includes 17 pixels in the horizontal direction and 17 pixels in the vertical direction (hereinafter referred to as "17×17"). The reference block data storage memory 22 stores data of a region (a reference region) including 144 reference blocks whose central pixels are set as reference points (rx, ry).

Here, because a block whose central pixel is set as the pixel of interest is the base block itself, the block is excluded from a calculation target for a correlation value with the base block.

Here, the arrangement of the reference points in the checkered pattern means that pixels which are reference points and pixels which are not reference points are alternately arranged every pixel in the horizontal direction and the vertical direction.

The block size for the base block and the reference block can be selected from four types of block sizes such as a block size (9×9) B9, a block size (7×7) B7, a block size (5×5) B5, and a block size (3×3) B3 as shown in FIG. 2. In the base block and the reference block, the central pixel is fixed when the block size is changed. That is, the central pixel is the same regardless of the block size.

The correlation value calculation device 100 determines an optimum block size by a relationship between the pixel of interest and its adjacent pixels. The determination of the block size will be described below in the description of the block size determination unit 4.

The correlation value calculation unit 3 includes first intermediate correlation value calculation units 31, second intermediate correlation value calculation units 32, and a correlation value interpolation unit 35 and is a circuit configured to calculate 144 correlation values between one base block and 144 reference blocks in parallel.

Data of the one base block stored in the base block data storage memory 21 and data of the 144 reference blocks stored in the reference block data storage memory 22 are input.

As shown in FIG. 1, the correlation value calculation unit 3 is provided with 144 units including the first intermediate correlation value calculation units 31 and the second intermediate correlation value calculation units 32 and the 144 correlation values can be calculated in parallel thereby.

The correlation value calculation unit 3 calculates a sum of absolute differences (SAD) as the correlation value. The SAD at the reference point (rx, ry) is calculated by the following Eq. 1.

[Math. 1]

$$sad(rx, ry) = \sum_{-size \leq i, j \leq size} |img(tx + i, ty + j) - img(rx + i, ry + j)| \quad \text{Eq. 1}$$

In Eq. 1, img(x, y) is pixel data of an image (the frame data 10) at XY coordinates (x, y). Either monochrome or color data may be used, or intermediate data from an image sensor may be used. Size indicates ((the number of pixels from the central pixel to the endmost pixel)−1).

The calculation of the correlation values between the base block and the reference block may be collectively calculated for the block or may be calculated by calculating a correlation value for one line of the block and accumulating and summing calculated correlation values for lines.

The correlation value calculation unit 3 can simultaneously obtain results of calculating correlation values between the one base block and the 144 reference blocks in a block size determined by the block size determination unit 4 (hereinafter referred to as a "target block size (a selected block size)") to be described below.

Figure 3:
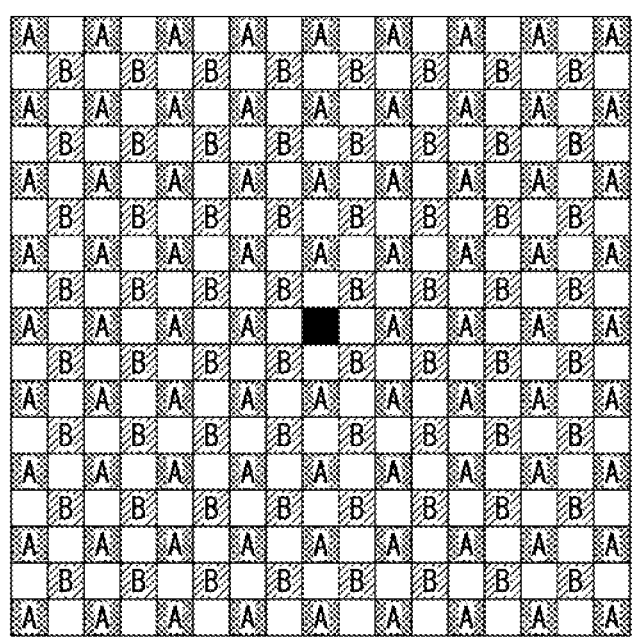
FIG. 3 is a diagram showing classification of reference points in the correlation value calculation device according to the first embodiment of the present invention.

The reference points arranged in the checkered pattern are classified into two types as shown in FIG. 3.

In a reference block in which a reference point denoted by A (hereinafter referred to as a "reference point A") is set as a central pixel (hereinafter referred to as a "reference block A"), correlation values for all four types of block sizes (9×9, 7×7, 5×5, and 3×3) are calculated.

In a reference block in which a reference point denoted by B (hereinafter referred to as a "reference point B") is set as a central pixel (hereinafter referred to as a "reference block B"), a correlation value for only a minimum block size (3×3) is calculated.

As shown in FIG. 3, reference points A (first reference pixels) which are some of the reference points and reference points B (second reference pixels) which are the remaining reference points are adjacent to each other in a diagonal direction. There are 80 reference points A and 64 reference points B among the 144 reference points within the reference region.

In the reference block A, correlation values for all the four types of block sizes 9×9, 7×7, 5×5, and 3×3 are calculated. That is, four types of correlation values for a 9×9 base block and a 9×9 reference block, a 7×7 base block and a 7×7 reference block, a 5×5 base block and a 5×5 reference block, and a 3×3 base block and a 3×3 reference block are calculated in the reference block A.

The four types of correlation values of the reference block A are calculated by the first intermediate correlation value calculation unit 31.

Figure 5:
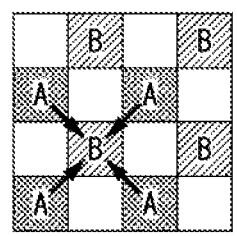
FIG. 5 is a diagram showing adjacent reference blocks A to be used in an interpolation process on a reference block B in the correlation value calculation device according to the first embodiment of the present invention.

In the reference block B, a correlation value between the 3×3 base block and the 3×3 reference block is calculated. In relation to the other three types of block sizes (9×9, 7×7, and 5×5), an interpolated correlation value using correlation values calculated for adjacent reference blocks A is obtained as shown in FIG. 5.

The correlation value for the 3×3 block size is calculated by the second intermediate correlation value calculation unit 32 and an interpolated correlation value is calculated by the correlation value interpolation unit 35.

In the reference block B, no correlation value is calculated in relation to the three types of block sizes (9×9, 7×7, and 5×5) other than the block size (3×3) and the interpolated correlation value using the correlation values calculated for the adjacent reference blocks A is calculated. This utilizes the tendency that a pixel configuration of the reference block B is normally similar to pixel configurations of the adjacent reference blocks A. An interpolation method will be described below in the description of the correlation value interpolation unit 35.

Figure 4:
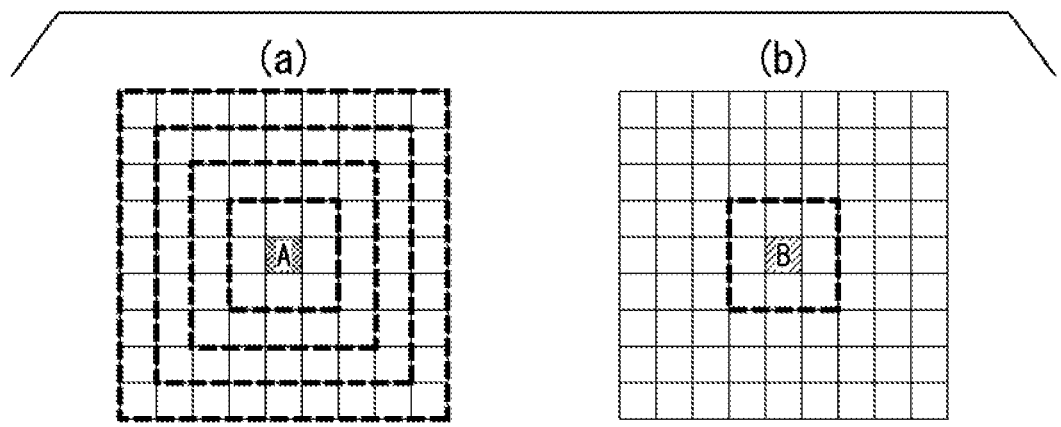
FIG. 4 is a diagram showing block sizes of the base block and the reference block in the correlation value calculation device according to the first embodiment of the present invention.

As shown in FIG. 4(*a*), the first intermediate correlation value calculation unit 31 calculates correlation values for all the four types of block sizes (9×9, 7×7, 5×5, and 3×3). In any block size, the reference point A is set as the central pixel.

Figure 6:
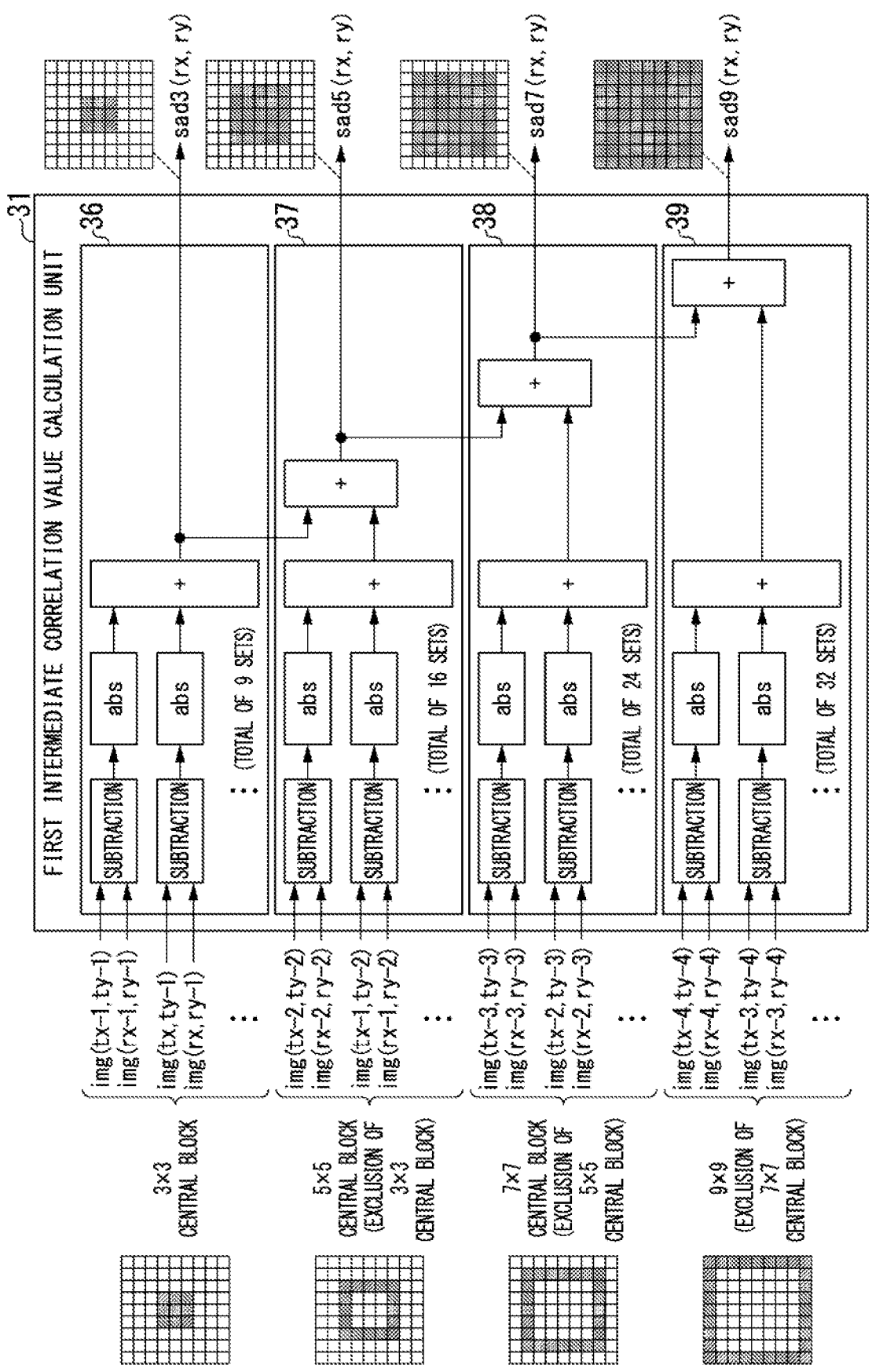
FIG. 6 is a diagram showing a configuration of a first intermediate correlation value calculation unit in the correlation value calculation device according to the first embodiment of the present invention.

FIG. 6 is a diagram showing a configuration of a calculation circuit of the first intermediate correlation value calculation unit 31. Data of a base block having a block size (9×9) in which coordinates (tx, ty) of a pixel of interest are set as those of the central pixel and which includes upper-left coordinates (tx−4, ty−4) and lower-right coordinates (tx+4, ty+4) is input from the base block data storage memory 21 to the first intermediate correlation value calculation unit 31. The data of the same base block is input to all 80 first intermediate correlation value calculation units 31.

Also, data of a reference block A having a block size (9×9) in which a reference point A (rx, ry) is set as the central pixel and which includes upper-left coordinates (rx−4, ry−4) and lower-right coordinates (rx+4, ry+4) is input from the reference block data storage memory 22 to the first intermediate correlation value calculation unit 31. Data of 80 different reference blocks A whose central pixels are set as 80 reference points A is input to each of the 80 first intermediate correlation value calculation units 31.

The first intermediate correlation value calculation unit 31 includes four blocks (a first block 36, a second block 37, a third block 38, and a fourth block 39).

The first block 36 is a circuit configured to calculate a correlation value of 9 pixels of the 3×3 region. Differences between 9 pixels centered on a pixel img(tx, ty) of a base block and 9 pixels centered on a pixel img(rx, ry) of a reference block are calculated by subtractors for respective pixels and absolute values (abs) are obtained. The first block 36 stuns the absolute values of the differences of all the 9 pixels and outputs the correlation value of the 3×3 region.

The second block 37 is a circuit configured to calculate a correlation value of 25 pixels of the 5×5 region. The calculation result of the 9 pixels of the first block 36 and a correlation value of the remaining 16 adjacent pixels are combined to calculate the correlation value of the 25 pixels.

The third block 38 is a circuit configured to calculate a correlation value of 49 pixels of the 7×7 region. The calculation result of the 25 pixels of the second block 37 and a correlation value of the remaining 24 adjacent pixels are combined to calculate the correlation value of the 49 pixels.

The fourth block 39 is a circuit configured to calculate a correlation value of 81 pixels of the 9×9 region. The calculation result of the 49 pixels of the third block 38 and a correlation value of the remaining 32 adjacent pixels are combined to calculate the correlation value of the 81 pixels.

The first intermediate correlation value calculation unit 31 outputs the calculated correlation values for all the four types of block sizes (9×9, 7×7, 5×5, and 3×3).

Also, the first intermediate correlation value calculation unit 31 of the present embodiment shown in FIG. 6 is an example of the circuit configured to calculate the correlation values for all the four types of block sizes (9×9, 7×7, 5×5, and 3×3). Other circuits may be used as long as they are circuits configured to calculate the correlation values.

Also, all the data included in the 9×9 region need not necessarily be input as data of the base block and the reference block to be input to the first intermediate correlation value calculation unit. For example, when the correlation value for the block size (9×9) is unnecessary and only the correlation values for the three types of block sizes (7×7, 5×5, and 3×3) are necessary, it is only necessary to input data of the base block and the reference block included in the 7×7 region. The amount of data transfer can be reduced and an increase in speed and power saving can be implemented.

The second intermediate correlation value calculation unit 32 calculates a correlation value for only the minimum block size (3×3) as shown in FIG. 4(*b*).

Figure 7:
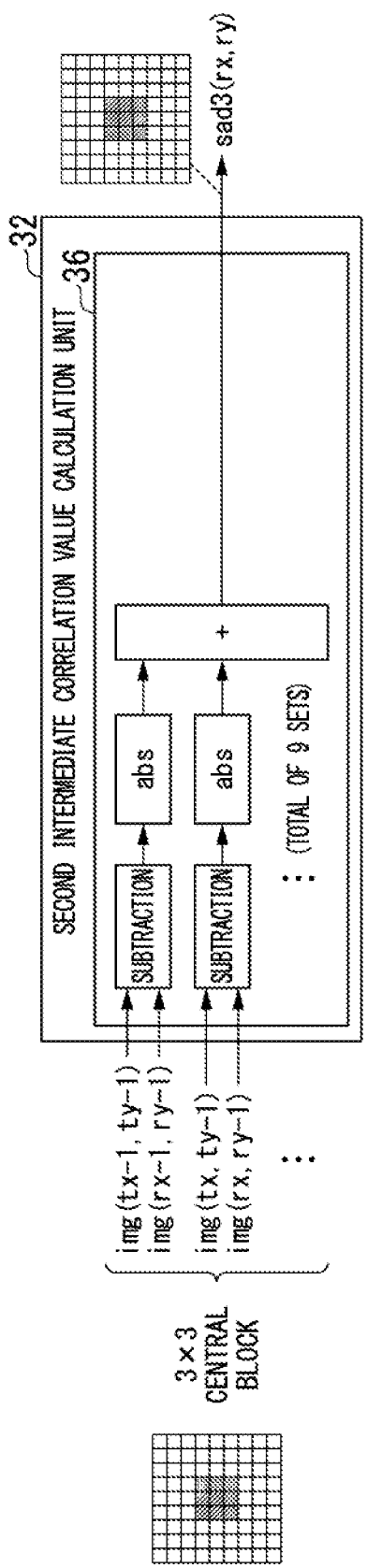
FIG. 7 is a diagram showing a configuration of a second intermediate correlation value calculation unit in the correlation value calculation device according to the first embodiment of the present invention.

FIG. 7 is a diagram showing a configuration of a calculation circuit of the second intermediate correlation value calculation unit 32. In the case of coordinates (tx, ty) of a pixel of interest, data of a base block having a block size (3×3) including upper-left coordinates (tx−1, ty−1) and lower-right, coordinates (tx+1, ty+1) is input from the base block data storage memory 21 to the second intermediate correlation value calculation unit 32. The data of the same base block is input to all the 64 second intermediate correlation value calculation units.

Also, data of a reference block B having a block size (3×3) in which a reference point B (rx, ry) is set as the central pixel and which includes upper-left coordinates (rx−1, ry−1) and lower-right coordinates (rx+1, ry+1) is input from the reference block data storage memory 22 to the second intermediate correlation value calculation unit 32. Data of 64 different reference blocks B whose central pixels are 64 reference points B is input to each of the 64 second intermediate correlation value calculation units 32.

The second intermediate correlation value calculation unit 32 includes only the same circuit as that of the first block 36 of the first intermediate correlation value calculation unit 31. Thus, the circuit scale of the second intermediate correlation value calculation unit 32 is smaller than that of the first intermediate correlation value calculation unit 31.

The second intermediate correlation value calculation unit 32 outputs a calculated correlation value for the block size (3×3).

Also, the second intermediate correlation value calculation unit 32 of the present embodiment shown in FIG. 7 is an example of a circuit configured to calculate the correlation value for the block size (3×3), and other configurations may be used as long as they are circuits configured to calculate the correlation value for the block size (3×3).

The correlation value interpolation unit 35 performs an interpolation/approximation process on a correlation value to output the correlation value.

In the interpolation/approximation process, correlation values (interpolation target correlation values) of reference blocks B for the three types of block sizes (9×9, 7×7, and 5×5) are calculated by an approximation using calculated correlation values in the adjacent reference blocks A with respect to the reference blocks B (interpolation target reference blocks B) for which no correlation value is calculated with respect to the three types of block sizes (9×9, 7×7, and 5×5).

The correlation value interpolation unit 35 calculates a difference average value of the correlation values calculated in the adjacent reference blocks A as shown in the following calculation equations and obtains an approximate value by adding the difference average value to a correlation value (a calculated correlation value) for the block size 3×3 of the interpolation target reference block B.

The calculation equations are represented by Eqs. 2 to 5. An SAD to be output is set as sad(x, y) and SADs for the block sizes (9×9, 7×7, 5×5, and 3×3) are set as sad9(x, y), sad7(x, y), sad5(x, y), and sad3(x, y), respectively. A target block size is set as sizeT and an SAD value in the target block size is set as sadT(x, y).

[Math. 2]

$$sad(x, y) = \begin{cases} sad3(x, y) & (sizeT = 3\times 3) \\ sad3(x, y) + \text{dif\_ave}(x, y) & (sizeT \neq 3\times 3) \end{cases} \quad \text{Eq. 2}$$

Here, dif_ave(x, y) is calculated by Eq. 3.

[Math. 3]

$$\text{dif\_ave}(x, y) = \frac{dif(x-1, y-1) + dif(x+1, y-1) + dif(x-1, y+1) + dif(x+1, y+1)}{4} \quad \text{Eq. 3}$$

Here, dif(x, y) is calculated by Eq. 4.

[Math. 4]

$$dif(x,y) = sadT(x,y) - sad3(x,y) \quad \text{Eq. 4}$$

Here, sadT(x, y) is calculated by Eq. 5.

[Math. 5]

$$sadT(x, y) = \begin{cases} sad5(x, y) & (sizeT = 5\times 5) \\ sad7(x, y) & (sizeT = 7\times 7) \\ sad9(x, y) & (sizeT = 9\times 9) \end{cases} \quad \text{Eq. 5}$$

Figure 8:
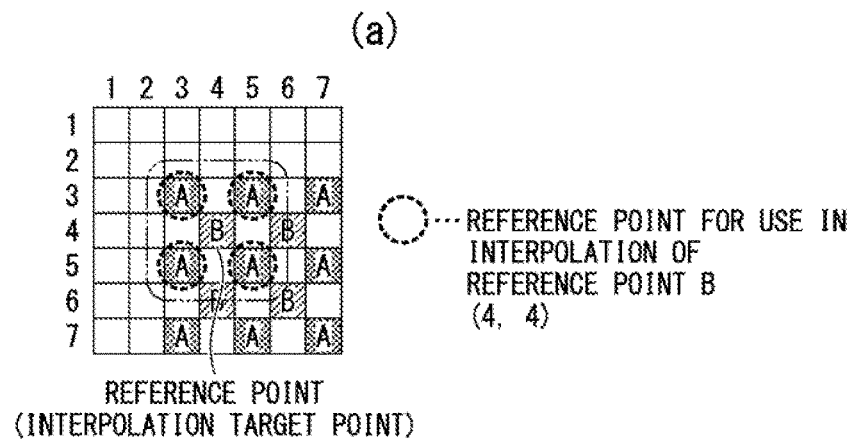
FIG. 8 is a diagram showing a configuration of a correlation value interpolation unit in the correlation value calculation device according to the first embodiment of the present invention.
Figure 8:
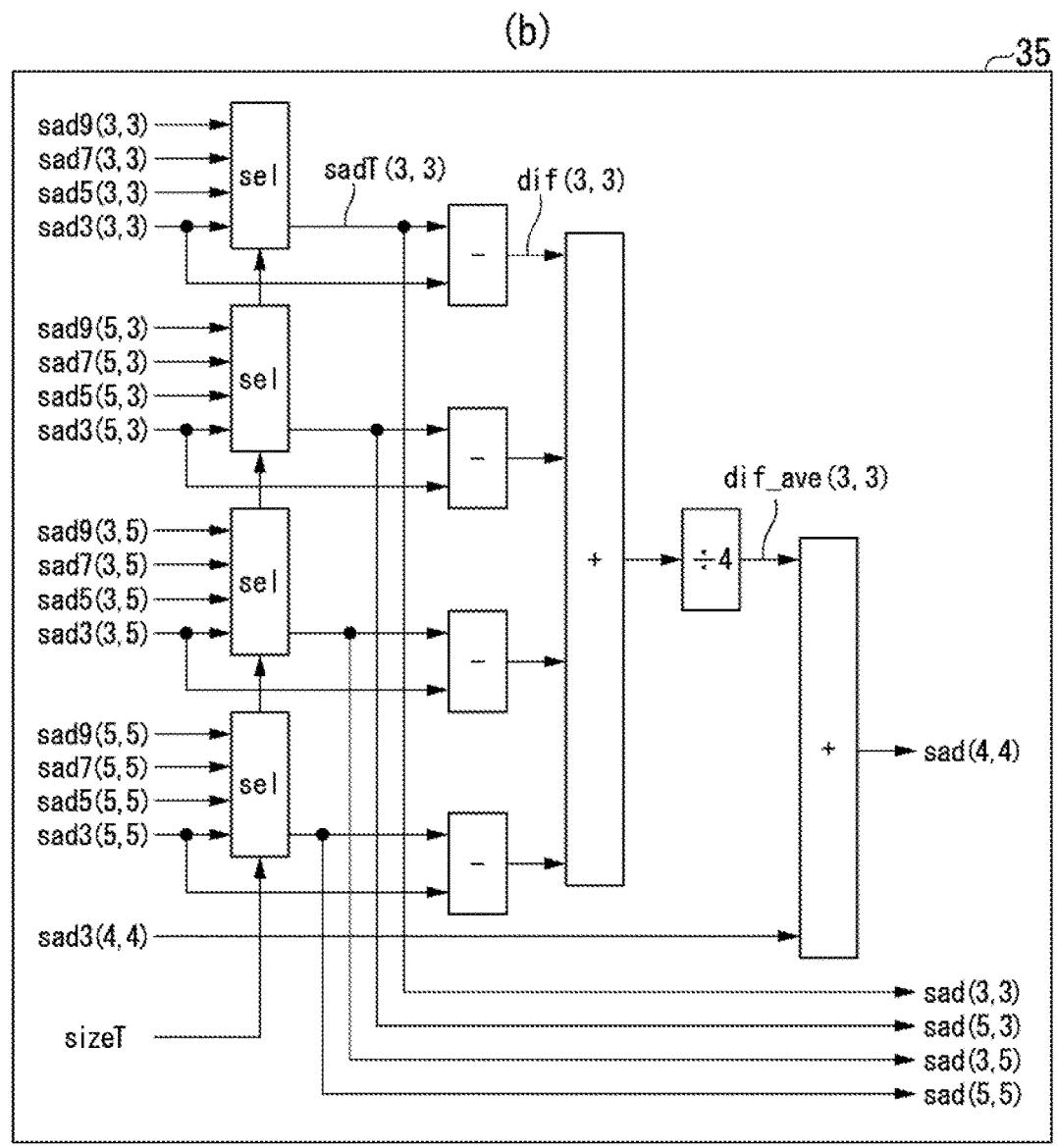

FIG. 8 is a diagram showing a configuration of the correlation value interpolation unit. FIG. 8(*b*) is a diagram showing a configuration of a calculation circuit of the correlation value interpolation unit 35. The correlation value interpolation unit 35 shown in FIG. 8(*b*) performs an interpolation/approximation process using a reference block B whose central pixel is set as a reference point B (4, 4) shown in FIG. 8A as an interpolation target reference block B.

Calculated correlation values in reference blocks A whose central pixels are set as a reference point A (3, 3), a reference point A (3, 5), a reference point A (5, 3), and a reference point A (5, 5) that are reference points A closest to the reference point B (4, 4) are input from the first intermediate correlation value calculation unit 31 to the correlation value interpolation unit 35. Correlation values for all the four types of block sizes (9×9, 7×7, 5×5, and 3×3) for the above-described reference blocks A are input to the correlation value interpolation unit 35. Also, a calculated correlation value for the block size (3×3) in the reference block B whose central pixel is set as the reference point B (4, 4) is input from the second intermediate correlation value calculation unit 32.

In accordance with a target block size sizeT input from the block size determination unit 4 to be described below, sadT(x, y) is selected by a selector. dif(x, y) is calculated by subtracting sad3(x, y) from sadT(x, y). Next, an average value dif_ave(x, y) of dif(x, y) of four reference blocks A is calculated. Finally, the correlation value sad3(4, 4) for the block size (3×3) in the interpolation target reference block B is added to calculate an approximate value sad(4, 4).

The correlation value interpolation unit 35 also inputs the calculated correlation value of the reference block A whose central pixel is set as the closest reference point A at a reference point B (x, y) other than the reference point B (4, 4) and performs a similar interpolation/approximation process as described above.

The block size determination unit 4 determines a target block size suitable for each pixel of interest. For example, because a difference in correlation is unlikely to occur unless the range is wide in the case of a flat image with little variation in a pixel value, the target block size is increased. When a region around the pixel of interest is a picture of a fine design or the like with a large variation in a pixel value, the pixel value changes in a small range, so that the target block size is decreased. By decreasing the target block size, data transfer and calculation required for processing can be reduced and power consumption can be suitably reduced.

By setting an evaluation value for use in the determination to E(x, y), a sum of differences between a pixel of interest and an average value of a range of ±sizeE pixels at the top, bottom, left, and right of the pixel of interest is calculated as the evaluation value (Eq. 6). The target block size is determined to decrease as the evaluation value increases and a signal (a target block size) indicating any one of the block sizes (9×9, 7×7, 5×5, and 3×3) is output.

[Math. 6]

$$E(x, y) = \sum_{-sizeE \leq i, j \leq sizeE} |img(x+i, y+j) - ave(x, y)| \quad \text{Eq. 6}$$

Here, ave(x, y) is obtained from Eq. 7.

[Math. 7]

$$ave(x, y) = \sum_{-sizeE \leq k, l \leq sizeE} img(x+k, y+l)/(sizeE \times 2 + 1)^2 \quad \text{Eq. 7}$$

The block size determination unit 4 determines the target block size for each pixel of interest. That is, the correlation value calculation device 100 calculates correlation values between one base block and 144 reference blocks for each pixel of interest in parallel according to the determined target block size.

Next, the operation of the correlation value calculation device 100 will be described.

First, target frame data 10 is stored in the main memory 1. Even if all data of the frame data 10 is not stored in the main memory 1, correlation value calculations on target blocks may be sequentially executed at a point in time when data of a base block of the correlation value calculation target and data of a reference block are stored in the main memory 1.

The data of the base block that is the calculation target is sequentially stored in the base block data storage memory 21. Also, the data of the reference block of a reference region corresponding to the base block that is the calculation target is stored in the reference block data storage memory 22.

The block size determination unit 4 determines the target block size and the determined target block size is transferred to the correlation value calculation unit 3.

When the data of the base block that is the calculation target is stored in the base block data storage memory 21 and the calculation of the correlation value of the target block is started at a point in time when the data of the reference block that is the calculation target is stored in the reference block data storage memory 22. It is only necessary to transfer data necessary for the correlation value calculation in the determined target block size to the block memory 2.

The correlation value calculation unit 3 outputs results of calculating correlation values between one base block and 144 reference blocks to, for example, a motion vector detection device or the like.

After the above-described process on one base block is completed, a similar process is sequentially iterated with respect to the next base block and the correlation value calculation is performed on all the frame data 10.

According to the correlation value calculation device 100 of the present embodiment, the correlation value calculation device 100 can select a block size from several types of block sizes. In the calculation of correlation values between the base block and the reference blocks B whose central pixels are set as some reference points among reference points within a reference region, only a correlation value for the minimum block size is calculated and correlation values for the other block sizes are obtained by an interpolation. Thereby, the circuit scale of the correlation value calculation device can be reduced.

The correlation value calculated by the correlation value calculation device 100 of the present embodiment is used for a noise reduction process, motion vector detection, and the like.

Modified Examples

Although the first embodiment of the present invention has been described above in detail with reference to the drawings, the specific configuration is not limited to the embodiment and design changes and the like within the spirit and scope of the present invention are also included. Also, a configuration can be made by appropriately combining components shown in the above-described first embodiment and modified examples.

For example, although the correlation value calculation device 100 of the above-described embodiment is a circuit configured to calculate a sum of absolute differences (SAD) as a correlation value, the correlation value is not limited thereto. For example, the correlation value may be a sum of squared differences (SSD), a value of normalized cross-correlation (NCC), a value of zero-mean normalized cross-correlation (ZNCC), or the like.

In the above-described embodiment, the base block and the reference block treat a central pixel as the pixel of interest and the reference point and the central pixel is fixed when the block size is changed. The pixel configurations of the base block and the reference block and the form in which the block size is changed are not limited thereto. For example, the pixel of interest and the reference point may be arranged at an upper-left position may be made and an upper-left pixel may be fixed when the block size is changed.

In the above-described embodiment, the second intermediate correlation value calculation unit 32 calculates the correlation value for only the minimum block size (3×3) with respect to the reference block B. However, the reference block B and the configuration of the second intermediate correlation value calculation unit 32 are not limited thereto. It is only necessary for the second intermediate correlation value calculation unit 32 to calculate correlation values for at least some of the block sizes among the four types of block sizes. In this case, the correlation value interpolation unit calculates correlation values for other block sizes that are not calculated by the second intermediate correlation value calculation unit 32 according to an interpolation.

Although the reference points are arranged in a checkered pattern in a specific region in the above-described embodiment, the arrangement of the reference points is not limited thereto. For example, the reference points may be arranged without gaps in a specific region or may be arranged irregularly.

Although there are four types of block sizes (9×9, 7×7, 5×5, and 3×3) in the above-described embodiment, the types of block sizes and the number of block sizes are not limited thereto. For example, the block size may be a block size (15×15) or (15×9). Furthermore, the number of pixels in the horizontal or vertical direction may be an even number as in 16×16 and 8×8.

Second Embodiment

A second embodiment of the present invention will be described with reference to FIGS. 9 to 13. The present embodiment is different from the first embodiment in terms of the form of the second intermediate correlation value calculation units 32. In the following description, the same reference signs are assigned to components common to those described above and a redundant description thereof will be omitted.

Figure 9:
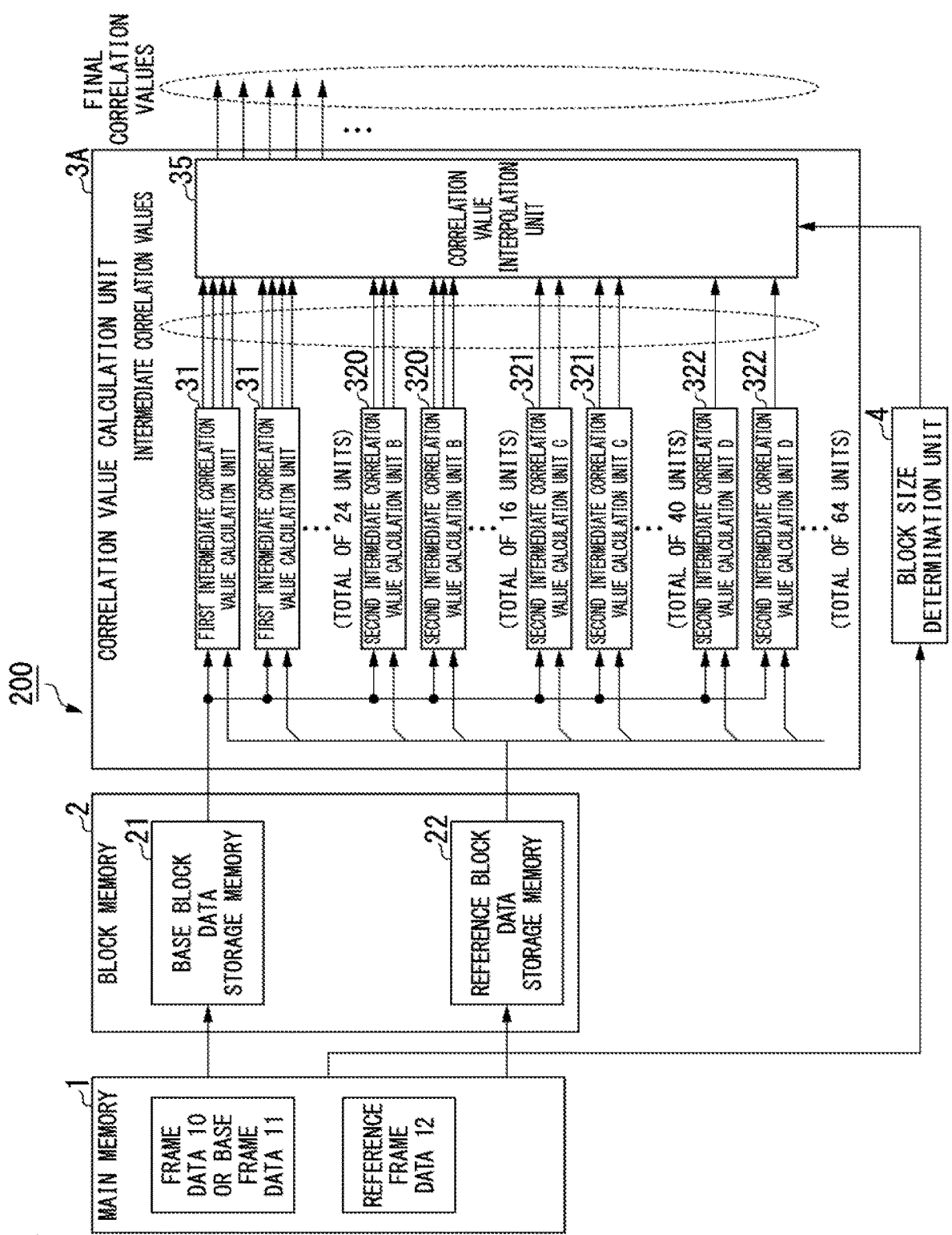
FIG. 9 is a diagram showing a correlation value calculation device according to a second embodiment of the present invention.
Figure 11:
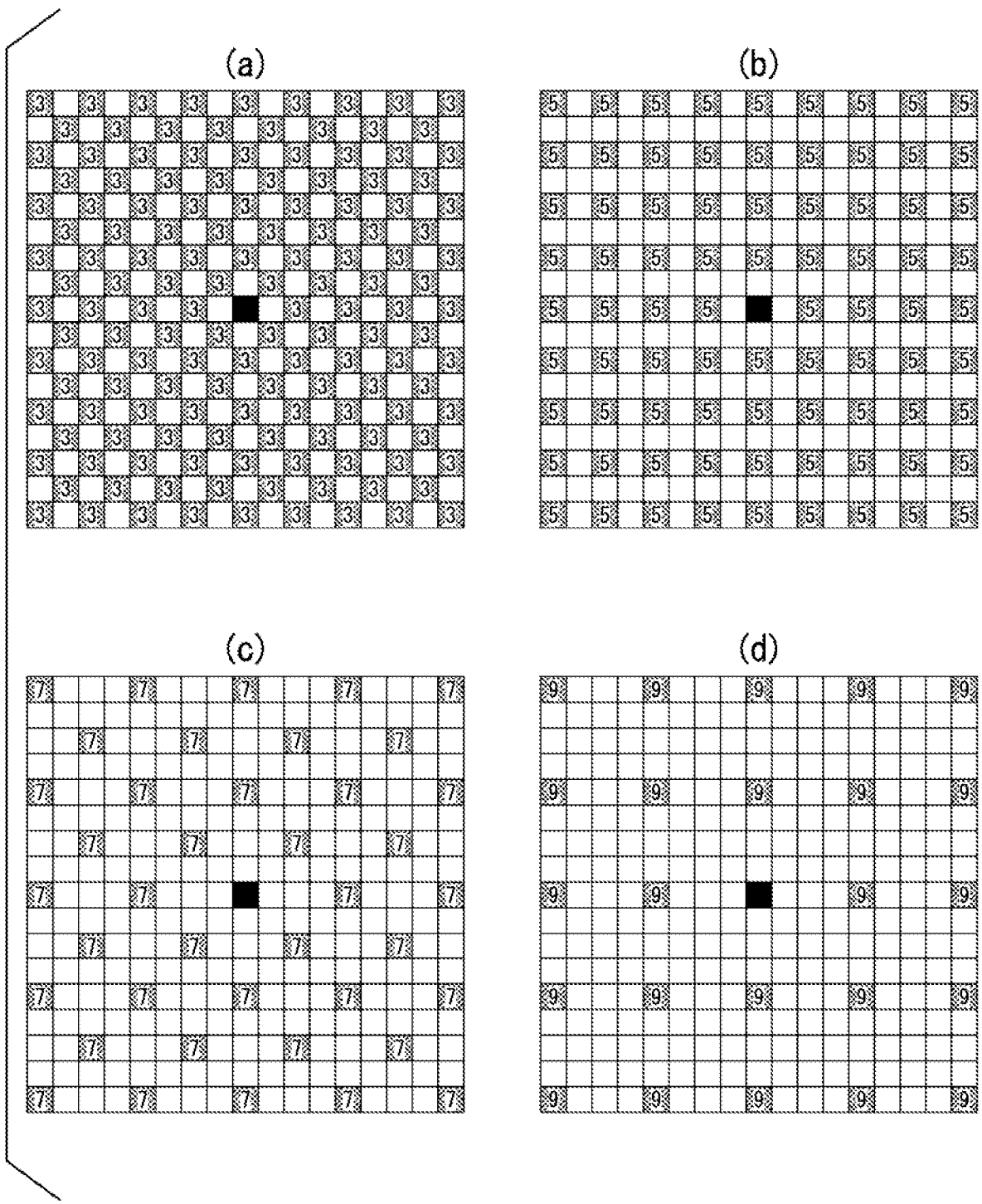
FIG. 11 is a diagram showing classification of reference points in the correlation value calculation device according to the second embodiment of the present invention.
Figure 12:
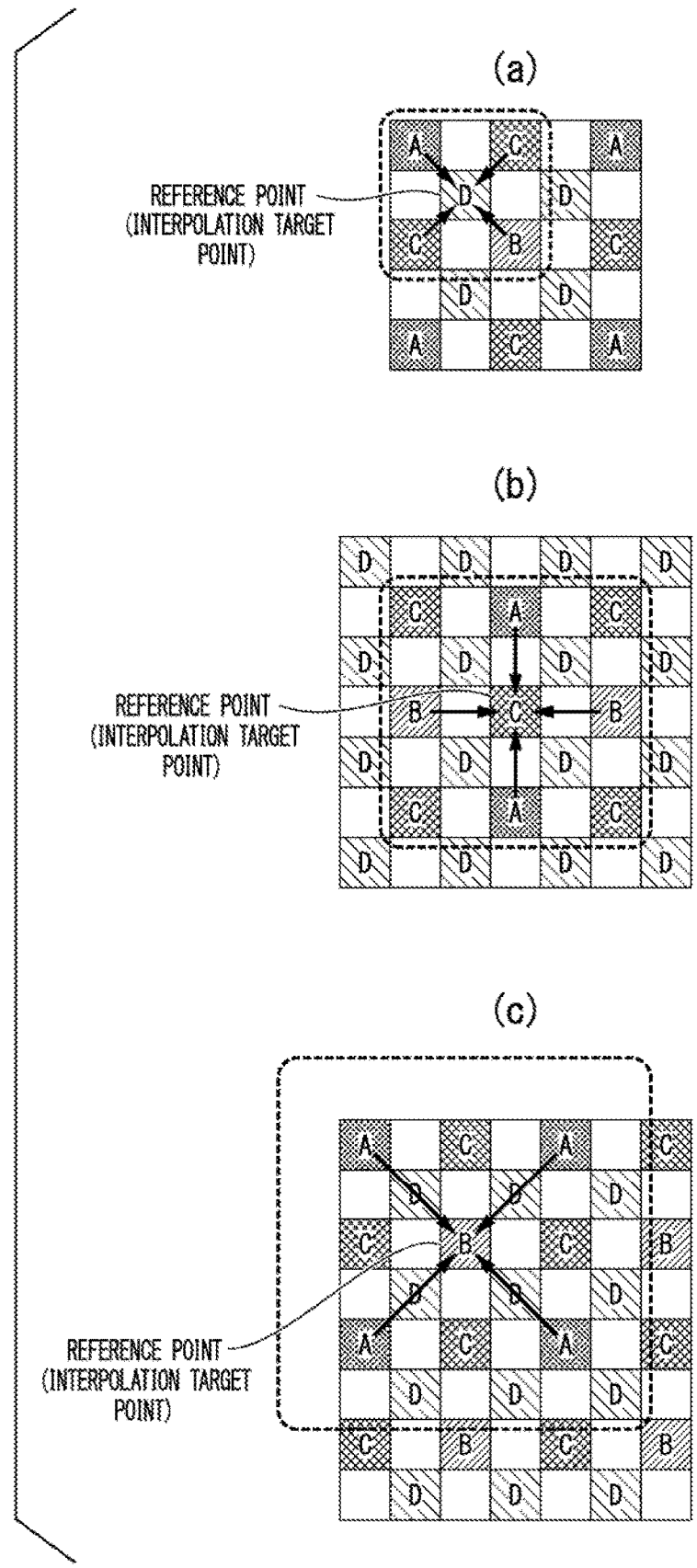
FIG. 12 is a diagram showing adjacent reference blocks to be used in an interpolation process on a reference block in the correlation value calculation device according to the second embodiment of the present invention.

FIG. 9 is a diagram showing a configuration of a correlation value calculation device 200 of the present embodiment. A correlation value calculation unit 3A of the correlation value calculation device 200 includes 24 first intermediate correlation value calculation units 31, 16 second intermediate correlation value calculation units B 320, 40 second intermediate correlation value calculation units C 321, 64 second intermediate correlation value calculation units D 322, and a correlation value interpolation unit 35.

As shown in FIG. 9, 144 emits including the first intermediate correlation value calculation units 31, the second intermediate correlation value calculation units B 320, the second intermediate correlation value calculation units C 321, and the second intermediate correlation value calculation units D 322 are included in the correlation value calculation unit 3A and 144 correlation values can be calculated in parallel thereby.

Figure 10:
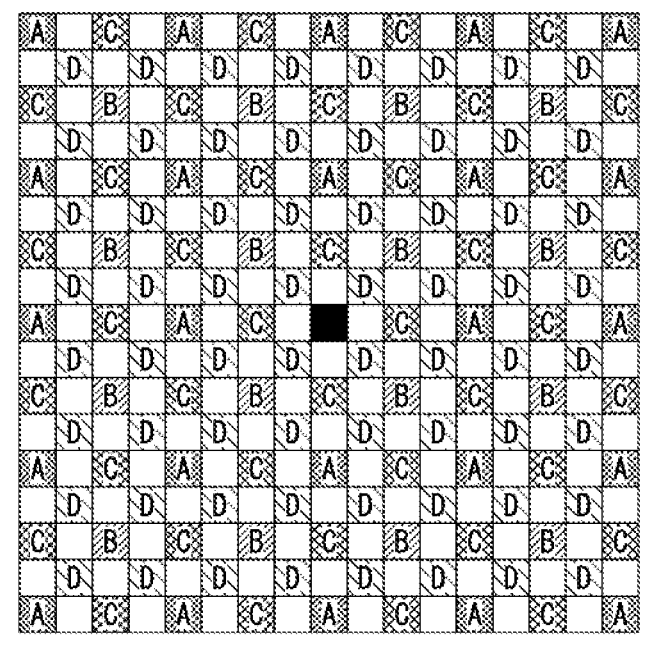

Reference points are arranged in a checkered pattern as in the first embodiment. The reference points arranged in the checkered pattern are classified into four types as shown in FIG. 10.

In reference blocks A whose central pixels are set as reference points A denoted by A, correlation values are calculated for all four types of block sizes (9×9, 7×7, 5×5, and 3×3) as in the first embodiment.

As in the first embodiment, correlation values for all the four types of block sizes (9×9, 7×7, 5×5, and 3×3) are not calculated with respect to reference points other than the reference points A. In the second embodiment, the reference points other than the reference points A are classified into the following three groups.

In reference blocks B whose central pixels are set as reference pixels B (a first group) denoted by B, correlation values are calculated for all three types of block sizes (7×7, 5×5, and 3×3).

In reference blocks C whose central pixels are set as reference pixels C (a second group) denoted by C, correlation, values are calculated for all two types of block sizes (5×5 and 3×3).

In reference blocks D whose central pixels are set as reference pixels D (a third group) denoted by D, a correlation value is calculated for only the minimum block size (3×3) as in the reference block B of the first embodiment.

The reference points B are arranged four pixels apart from each other in the horizontal direction and the vertical direction and the reference points D are arranged adjacent to the reference points B in four diagonal directions. Furthermore, the reference points C are arranged two pixels apart from the reference points B in the horizontal and vertical directions. Reference points at which the reference points B, C, and D are not arranged are arranged as the reference points A.

The reference points A, B, C, and D are arranged such that reference points adjacent to each other in the diagonal direction become different reference points, as shown in FIG. 10. There are 24 reference points A, 16 reference points B, 40 reference points C, and 64 reference points D among 144 reference points within the reference region.

FIG. 11(a) shows reference points for calculating a correlation value for a block size (3×3). The correlation value for the block size (3×3) is calculated at all reference points.

FIG. 11(b) shows reference points for calculating a correlation value for a block size (5×5).

FIG. 11(c) shows reference points for calculating a correlation value for a block size (7×7).

FIG. 11(d) shows reference points for calculating a correlation value for a block size (9×9).

In the reference block A, correlation values for all four types of block sizes (9×9, 7×7, 5×5, and 3×3) are calculated.

The four types of correlation values of the reference block A are calculated by the first intermediate correlation value calculation unit 31.

In the reference block B, correlation values for three types of block sizes (7×7, 5×5, and 3×3) are calculated. With respect to another type of block size (9×9), an interpolated correlation value using the correlation values calculated for the adjacent reference blocks A is obtained as shown in FIG. 12(c).

The three types of correlation values of the reference block B are calculated by the second intermediate correlation value calculation unit B 320 and the interpolated correlation value is calculated by the correlation value interpolation unit 35.

In the reference block C, correlation values for two types of block sizes (5×5 and 3×3) are calculated. With respect to the two other types of block sizes (9×9 and 7×7), an interpolated correlation value using the correlation values calculated for the adjacent reference blocks A and B is obtained as shown in FIG. 12(b).

Two types of correlation values of the reference block C are calculated by the second intermediate correlation value calculation unit C 321 and the interpolated correlation value is calculated by the correlation value interpolation unit 35.

In the reference block D, a correlation value between the 3×3 base block and the 3×3 reference block is calculated. With respect to the three other types of block sizes (9×9, 7×7, and 5×5), an interpolated correlation value using correlation values calculated for adjacent reference blocks A and B and C is obtained used as shown in FIG. 12(a). The correlation value for the block size (3×3) of the reference block D is calculated by the second intermediate correlation value calculation unit D 322 and the interpolated correlation value is calculated by the correlation value interpolation unit 35.

As the block size of the correlation value obtained by an interpolation is larger, the reference block for use in the interpolation process is more distant from the reference block of the interpolation target. A large block size is often determined to be a target block size when a pixel of interest is in an image region having a large number of flat low frequency components with little pixel variation, the correlation value is considered not to be greatly different even if a reference block is located slightly apart, and an error is considered to be small even if an interpolation is performed using data of the reference block.

The second intermediate correlation value calculation unit B 320 calculates correlation values for three types of block sizes (7×7, 5×5, and 3×3).

In the case of coordinates (tx, ty) of a pixel of interest, data of a base block having a block size (7×7) including upper-left coordinates (tx−3, ty−3) and lower-right coordinates (tx+3, ty+3) is input from the base block data storage memory 21 to the second intermediate correlation value calculation unit B 320. The data of the same base block is input to all 16 second intermediate correlation value calculation units.

Also, data of a reference block B having a block size (7×7) in which the reference point B (rx, ry) is set as the central pixel and which includes upper-left coordinates (rx−3, ry−3) and lower-right coordinates (rx+3, ry+3) is input from the reference block data storage memory 22 to the second intermediate correlation value calculation unit B 320. Data of 16 different reference blocks B whose central pixels are set to 16 reference points B is input to each of the 16 second intermediate correlation value calculation units B 320.

The second intermediate correlation value calculation unit C 321 calculates correlation values for two types of block sizes (5×5 and 3×3).

In the case of coordinates (tx, ty) of a pixel of interest, data of a base block having a block size (5×5) including upper-left coordinates (tx−2, ty−2) and lower-right coordinates (tx+2, ty+2) is input from the base block data storage memory 21 to the second intermediate correlation value calculation unit C 321. The data of the same base block is input to all 40 second intermediate correlation value calculation units.

Also, data of a reference block C having a block size (5×5) in which the reference point C (rx, ry) is set as the central pixel and which includes upper-left coordinates (rx−2, ry−2) and lower-right coordinates (rx+2, ry+2) is input from the reference block data storage memory 22 to the second intermediate correlation value calculation unit C 321. Data of 40 different reference blocks C whose central pixels are 40 reference points C is input to each of the 40 second intermediate correlation value calculation units C 321.

The second intermediate correlation value calculation unit D 322 calculates a correlation value for only the minimum block size (3×3) as in the second intermediate correlation value calculation unit 32 of the first embodiment.

In the case of coordinates (tx, ty) of a pixel of interest, data of a base block having a block size (3×3) including upper-left coordinates (tx−1, ty−1) and lower-right coordinates (tx+1, ty+1) is input from the base block data storage memory 21 to the second intermediate correlation value calculation unit D 322. The data of the same base block is input to all 64 second intermediate correlation value calculation units.

Also, data of a reference block D having a block size (3×3) in which the reference point D (rx, ry) is set as the central pixel and which, includes upper-left coordinates (rx−1, ry−1) and lower-right coordinates (rx+1, ry+1) is input from the reference block data storage memory 22 to the second intermediate correlation value calculation unit D 322. Data of 64 different reference blocks D whose central pixels are 64 reference points D is input to each of the 64 second intermediate correlation value calculation units D 322.

That is, the second intermediate correlation value calculation unit B 320, the second intermediate correlation value calculation unit C 321, and the second intermediate correlation value calculation unit D 322 do not calculate correlation values for all the four types of block sizes as in the second intermediate correlation value calculation unit 32 of the first embodiment.

The correlation value interpolation unit 35 performs an interpolation/approximation process on a correlation value to output the correlation value as in the first embodiment.

In the interpolation/approximation process, correlation values (interpolation target correlation values) of the reference blocks B, C, and D for which the correlation values for all four types of block sizes have not been calculated are calculated by an approximation.

Although the interpolation/approximation process may take a difference between an SAD (sadT) of the target block size and an SAD (sad3) of the block size (3×3) as in the first embodiment, a difference between the SAD (sadT) of the target block size and an SAD (sadM) of the maximum block size of the SAD (calculated correlation value) calculated in the interpolation target reference block may be taken. In this case, because the difference from the target block size becomes small, the error during the interpolation can be suppressed and the accuracy can be improved as compared with the approximation method of the first embodiment.

The calculation equations are represented by Eqs. 8 to 12.

[Math. 8]

$$sad(x, y) = \begin{cases} sad3(x, y) & (sizeT = 3\times 3) \\ sad3(x, y) + \text{dif\_ave}(x, y) & (sizeT \neq 3\times 3) \end{cases} \quad \text{Eq. 8}$$

Here, dif_ave(x, y) is calculated by Eq. 9. Here, the coordinates of the four pixels to be used in the interpolation process are set as (x1, y1), (x2, y2), (x3, y4), and (x4, y4).

[Math. 9]

$$\text{dif\_ave}(x, y) = \frac{dif(x1, y1) + dif(x2, y2) + dif(x3, y3) + dif(x4, y4)}{4} \quad \text{Eq. 9}$$

Here, dif(x, y) is calculated by Eq. 10.

[Math. 10]

$$\text{dif}(x,y) = \text{sad}T(x,y) - \text{sad}M(x,y) \quad \text{Eq. 10}$$

Here, sadT(x, y) is calculated by Eq. 11.

[Math. 11]

$$sadT(x, y) = \begin{cases} sad5(x, y) & (sizeT = 5\times 5) \\ sad7(x, y) & (sizeT = 7\times 7) \\ sad9(x, y) & (sizeT = 9\times 9) \end{cases} \quad \text{Eq. 11}$$

Here, sadM(x, y) is calculated by Eq. 12.

[Math. 12]

$$sadM(x, y) = \begin{cases} sad3(x, y) & (sizeM = 3\times 3) \\ sad5(x, y) & (sizeM = 5\times 5) \\ sad7(x, y) & (sizeM = 7\times 7) \\ sad9(x, y) & (sizeM = 9\times 9) \end{cases} \quad \text{Eq. 12}$$

According to the correlation value calculation device 200 of the present embodiment, the correlation value calculation device 200 can select a block size from several types of block sizes. In the calculation of correlation values between a base block and reference blocks D whose central pixels are set as some of reference points within a reference region, only the correlation value for the minimum block size is calculated and the correlation values for the other block sizes are obtained by an interpolation. Furthermore, also in reference blocks B and C, correlation values for some block sizes are obtained by an interpolation. Thereby, the error of the interpolation process can be reduced and the circuit scale of the correlation value calculation device can be more suitably reduced.

Modified Examples

Although the second embodiment of the present invention has been described above in detail with reference to the drawings, the specific configuration is not limited to the embodiment and design changes and the like within the spirit and scope of the present invention are also included. Also, a configuration can be made by appropriately combining components shown in the above-described second embodiment and modified examples.

Figure 13:
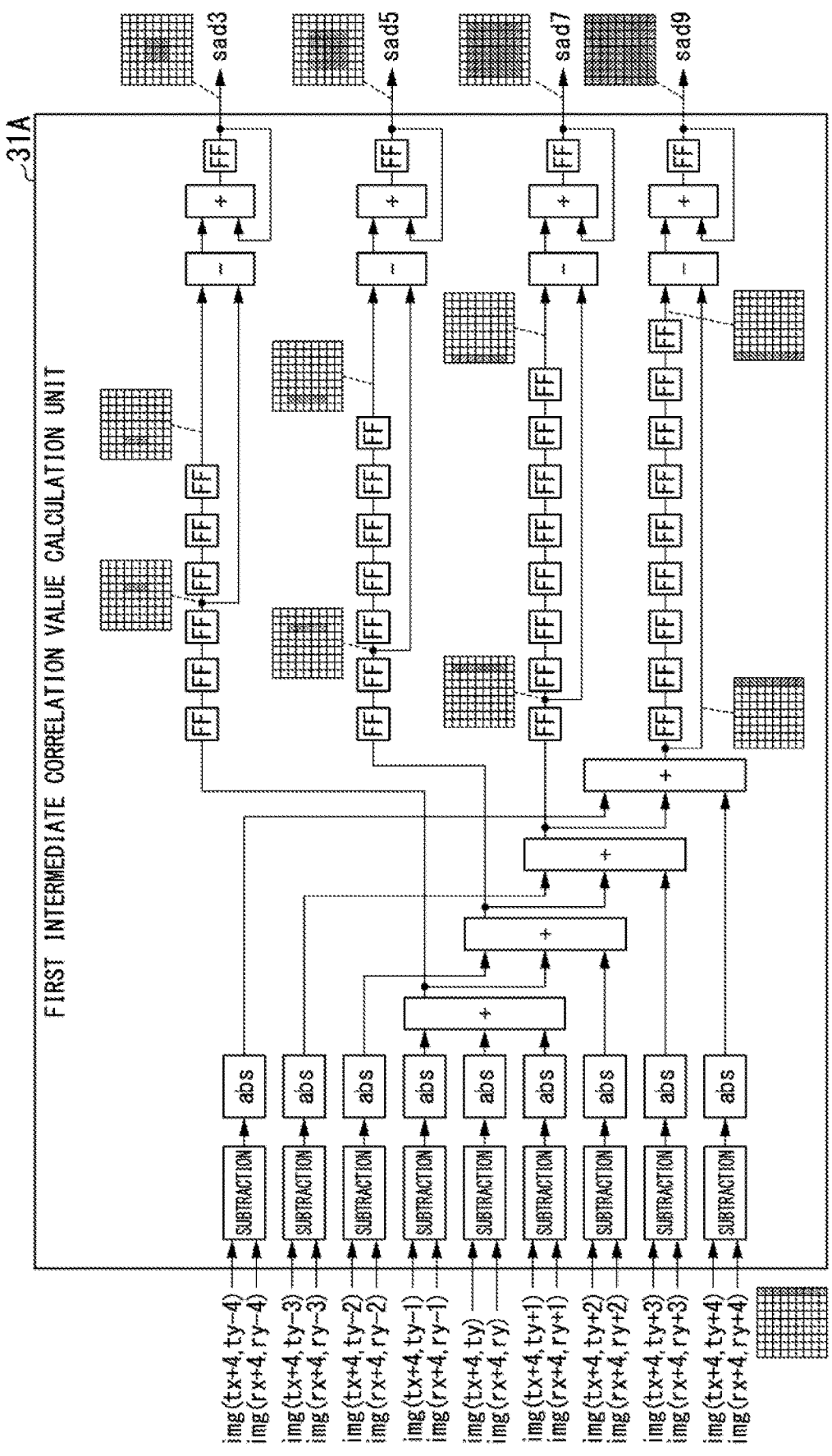
FIG. 13 is a diagram showing a configuration of a modified example of a first intermediate correlation value calculation unit in the correlation value calculation device according to the second embodiment of the present invention.

For example, as shown in FIG. 13, as in a first intermediate correlation value calculation unit 31A which is a modified example of the first intermediate correlation value calculation unit 31, when the pixel of interest is scanned in the horizontal direction, a correlation value may be calculated by accumulating differences between one new line initially entering a block and one old line exiting the block.

What is claimed is:

1. A correlation value calculation device for selecting a pixel of interest within an image and a plurality of reference pixels within the image or other image and calculating correlation values between a base block including the pixel of interest at a prescribed position and a plurality of reference blocks including each reference pixel at the prescribed position and having the same block size as the base block, the correlation value calculation device comprising:
   a block size determination circuit configured to select one block size for the base block and the reference block from a plurality of types of block sizes and determine the selected block size;
   first intermediate correlation value calculation circuits configured to calculate correlation values between the base block and the reference blocks including first reference pixels at the prescribed position in the plurality of types of block sizes, the first reference pixels being some of the reference pixels;
   second intermediate correlation value calculation circuits configured to calculate correlation values between the base block and the reference blocks including second reference pixels at the prescribed position in at least some block sizes among the plurality of types of block sizes, the second reference pixels being the remaining reference pixels; and
   a correlation value interpolation circuit configured to obtain interpolation target correlation values for other block sizes that are not calculated by the second intermediate correlation value calculation circuits according to an interpolation by using correlation values for the other block sizes calculated by the first intermediate correlation value calculation circuits and output the interpolation target correlation values as calculation results of the second intermediate correlation value calculation units circuits when the selected block sizes are the other block sizes.

2. The correlation value calculation device according to claim 1,
   wherein the reference pixels are arranged in a checkered pattern, and
   wherein the first reference pixels and the second reference pixels are arranged so that the first reference pixels and the second reference pixels are adjacent to each other in a diagonal direction.

3. The correlation value calculation device according to claim 2, wherein the plurality of types of block sizes are four types of block sizes including a block size of nine pixels in horizontal and vertical directions, a block size of seven pixels in the horizontal and vertical directions, a block size of five pixels in the horizontal and vertical directions, and a block size of three pixels in the horizontal and vertical directions.

4. The correlation value calculation device according to claim 1, wherein the plurality of types of block sizes are four types of block sizes including a block size of nine pixels in horizontal and vertical directions, a block size of seven pixels in the horizontal and vertical directions, a block size of five pixels in the horizontal and vertical directions, and a block size of three pixels in the horizontal and vertical directions.

5. The correlation value calculation device according to claim 4, wherein the second intermediate correlation value calculation circuit is configured to calculate a correlation value between the base block and the reference block including the second reference pixels at the prescribed position in only the block size of the three pixels in the horizontal and vertical directions.

6. The correlation value calculation device according to claim 1,
   wherein the reference pixels are arranged in a checkered pattern,
   wherein the second reference pixels are classified into three groups,
   wherein a first group of the second reference pixels is arranged so that the second reference pixels are arranged four pixels apart from each other in the horizontal direction and the vertical direction,
   wherein a third group of the second reference pixels is arranged so that the third group of the second reference pixels is adjacent to the first group of the second reference pixels in four diagonal directions,
   wherein a second group of the second reference pixels is arranged two pixels apart from the first group of the second reference pixels in the horizontal direction and the vertical direction, and
   wherein a reference point at which no second reference pixel is arranged is arranged as the first reference pixel.

7. The correlation value calculation device according to claim 6, wherein the plurality of types of block sizes are four types of block sizes including a block size of nine pixels in horizontal and vertical directions, a block size of seven pixels in the horizontal and vertical directions, a block size of five pixels in the horizontal and vertical directions, and a block size of three pixels in the horizontal and vertical directions.

8. The correlation value calculation device according to claim 7,
   wherein the second intermediate correlation value calculation circuit is configured to calculate correlation values between the base block and the reference blocks including the first group of the second reference pixels at the prescribed position in three types of block sizes including the block size of the seven pixels in the horizontal and vertical directions, the block size of the five pixels in the horizontal and vertical directions, and the block size of the three pixels in the horizontal and vertical directions, wherein the second intermediate correlation value calculation circuit is configured to calculate correlation values between the base block and the reference blocks including the second group of the second reference pixels at the prescribed position in two types of block sizes including the block size of the five pixels in the horizontal and vertical directions and the block size of the three pixels in the horizontal and vertical directions, and wherein the second intermediate correlation value calculation circuits is configured to calculate a correlation value between the base block and the reference block including the third group of the second reference pixels at the prescribed position with respect to only the block size of the three pixels in the horizontal and vertical directions.

9. The correlation value calculation device according to claim 1, wherein the correlation value interpolation circuit obtains the interpolation target correlation values according to the interpolation by summing calculated correlation values related to some block sizes calculated by the second intermediate correlation value calculation circuits and difference average values of correlation values related to the other block sizes calculated by the first intermediate correlation value calculation circuits and correlation values related to some block sizes calculated by the first intermediate correlation value calculation circuits.

\* \* \* \* \*